Patented July 23, 1946

2,404,717

UNITED STATES PATENT OFFICE 2,404,717

PREPARATION OF SOLUTIONS

Ray Clyde Houtz, Snyder, N. Y., assignor to E. I. du Pont de Nemours & Company, Wilmington, Del., a corporation of Delaware Application November 4, 1944, Serial No. 562,015

15 Claims. (Cl. 260—32)

This invention relates to a new composition of matter and shaped articles produced therefrom. More particularly, this invention relates to an organic solvent solution of polyacrylonitrile, i. e. polymerized acrylonitrile or polymerized vinyl cyanide $(CH_2=CHCN)_x$, and copolymers and interpolymers of acrylonitrile in which at least 85% by weight of the polymer is acrylonitrile, and to the production of shaped articles from said organic solvent solution of said polymers of acrylonitrile.

This application is a continuation-in-part of the copending application of Ray Clyde Houtz, Serial No. 447,446, filed June 17, 1942.

Polyacrylonitrile and copolymers and interpolymers of acrylonitrile with other polymerizable substances, for example vinyl or acrylic compounds, in which at least 85% by weight of the polymer is acrylonitrile have been known for some time and recognized as possessing desirable physical and chemical properties including toughness and insolubility in and insensitivity to common organic solvents such as methyl or ethyl alcohol, acetone, ethyl ether, ethyl acetate, hydrocarbon solvents, chlorinated hydrocarbons and the like. Because of these facts, numerous attempts have been made to form these polymeric materials into yarns, films and other shaped articles.

The copending application of George H. Latham, Serial No. 562,012, filed of even date herewith discloses solutions of polyacrylonitrile in dimethyl carbamyl compounds and the production of extruded and otherwise shaped articles and structures from such solutions. The above-said application of George H. Latham represents the first successful dissolution of polyacrylonitrile in a solvent to produce a solution which is suitable for the production of commercially useful textile yarns or wrapping tissue films and similar tough, flexible structures.

The present application relates to a similarly satisfactory dissolution of polyacrylonitrile in an organic solvent taken from a different class of organic compounds and the polyacrylonitrile solutions produced thereby are similarly satisfactory for the production of tough, flexible, dense, colorless yarns and films which are suitable for use in practically all general commercial applications of such products.

It has been known heretofore that concentrated aqueous solutions of inorganic salts such as lithium bromide, zinc chloride and sodium sulfocyanide will dissolve polyacrylonitrile and it has been proposed (Rein U. S. Patent No. 2,140,921) to employ the resulting solutions in the formation of yarns and films. However, it has been found substantially impossible to use the resulting compositions in such a manner. Their extrusion into coagulating baths of the type proposed (including such non-solvents for acrylonitrile as water, dilute acid, dilute salt solutions, etc.) result in the formation of shaped articles that contain large amounts of the inorganic salt of the proposed solvent. These salts are distributed throughout the structure and destroy the continuity of the polyacrylonitrile phase and the structure possesses poor physical properties. Removal of these salts, when possible, results in the formation of a porous, spongy, weak, undesirable structure that is very brittle and completely unsuited for use as a yarn or film. Moreover, when it is attempted to form a multi-filament yarn by extruding, for example the proposed aqueous sodium sulfocyanide polyacrylonitrile composition, into a dilute acid bath, it is found that the individual filaments obtained stick together to form an essentially monofilament structure that is extremely brittle and cannot be bent or worked without breaking.

U. S. Patent No. 2,167,537 to Tobis points out that certain copolymers of acrylonitrile and an acrylic acid ester (those copolymers containing not more than 65% of acrylonitrile) are soluble in mixtures of organic solvents such as dioxan, monochlorbenzene, cyclohexanone, etc. However, these liquids are incapable of dissolving or even swelling polyacrylonitrile or copolymers of acrylonitrile containing higher percentages of acrylonitrile, i. e. acrylonitrile polymers of the type with which this invention is concerned. As previously mentioned, polymers containing such high percentages (at least 85% by weight) of acrylonitrile are especially desirable for use because of their good physical properties and excellent chemical resistance.

It has also been proposed (Rein U. S. Patent No. 2,117,210) to dissolve polyacrylonitrile in molten quaternary ammonium salts such as benzyl pyridinium chloride, an ionizable salt. Although the resulting solution can allegedly be used to form yarns or films of polyacrylonitrile, the solution itself is dark red to brown in color, indicating that some decomposition of the polyacrylonitrile or some reaction between the polyacrylonitrile and the molten salt has probably taken place. Such solutions are not satisfactory for the production of commercially useful, shaped articles of polyacrylonitrile. Here again, it has been found practically impossible to obtain filamentary structures such as yarns from the composition. Films or filaments, when obtainable, are extremely brittle; they are highly colored and very weak, presumably because of the presence within them of residual quaternary ammonium salt. Removal of this salt is difficult and the resulting structures contain numerous and large voids that make the structures substantially useless for commercial purposes.

It is therefore an object of this invention to dissolve polyacrylonitrile or a copolymer or interpolymer of acrylonitrile in which at least 85% by weight of the polymer is acrylonitrile, in a solvent which does not react with or decompose the polymer and which may be substantially completely removed from the structures formed of such a solution.

It is another object of this invention to produce a solution of polyacrylonitrile or a copolymer or interpolymer of acrylonitrile in which at least 85% by weight of the polymer is acrylonitrile, in a solvent which does not react with or decompose the polymer, the solution being suitable for the formation of commercially useful, void free articles of polyacrylonitrile, for example yarns which are suitable as textile yarns and films which are suitable as wrapping tissue.

It is another object of this invention to produce a solution of polyacrylonitrile or a copolymer or interpolymer of acrylonitrile in which at least 85% by weight of the polymer is acrylonitrile, in a volatile organic solvent, which solution is stable over extended periods of time and is eminently suited for use in the manufacture of shaped articles such as yarns, films, tubes, straws, artificial horsehair, bristles and ribbons, or when highly concentrated, for use in the manufacture of molded articles.

It is a still further object of this invention to produce shaped articles and structures of polyacrylonitrile or copolymers or interpolymers of acrylonitrile in which at least 85% by weight of the polymer is acrylonitrile.

It is still another object of this invention to produce a shaped article or structure of polyacrylonitrile or copolymers or interpolymers of acrylonitrile in which at least 85% by weight of the polymer is acrylonitrile, for example a yarn, film, tube, bristle or the like which is tough, flexible, tenacious and free from voids.

Other objects of the invention will appear hereinafter.

The objects of the invention may be accomplished in general by dissolving polyacrylonitrile, or a copolymer or interpolymer of acrylonitrile in which at least 85% by weight of the polymer is acrylonitrile in a compound containing a sulfoxy methylene group (in which "sulfoxy" is as defined in Patent Office Classification Bulletin 74, page 30) and which compound is not a salt, for example dimethyl sulfoxide.

If the solvent has a relatively low boiling point (less than about 250° C.), the solution of acrylonitrile polymer may then be formed into a shaped structure, for example a yarn or film, and the solvent removed from the shaped structure to coagulate the same. When the solvent is relatively non-volatile and has a boiling point of about 300° C. or more, shaped articles may be made from the solution and at least a portion of the solvent may be retained therein as a plasticizer for the articles.

It has been recognized in recent years that under certain conditions, an atom of hydrogen is attracted by rather strong forces to two atoms instead of only one, so that it may be considered to be acting as a bond between them. This is called the hydrogen bond.

The difficulty of dissolving polymers containing at least 85% by weight of acrylonitrile is due to the presence within the polymer molecules of strong hydrogen bonding forces, and in order to dissolve one of these polymers, it is necessary to find a material which will undergo hydrogen bonding with the active hydrogen bonding groups of the polymer molecules and thus weaken the strong hydrogen bond within the polymer molecule and cause the hydrogen bonding forces to be shared between molecules of the polymer and the solvent. In this manner, it is possible to form a molecular dispersion of the polymer within the solvent and thus form a solution.

However, the strength of the hydrogen bonding capacity cannot be taken as the sole criterion as to whether or not a compound will function to dissolve an acrylonitrile polymer. It is also necessary that in order to function as a solvent for an acrylonitrile polymer, the compound contain certain groups which will be capable of satisfactorily sharing a hydrogen bonding force with the particular active group of the acrylonitrile polymer. In most instances, these groups require the presence of a hydrogen atom on a carbon atom to which the active group is attached (designated as an alpha-hydrogen atom). Such active groups as require the alpha-hydrogen atom are ineffective to impart solvent power if the alpha-hydrogen atom is missing.

It has now been found that groups capable of conferring solvent power include dimethyl carbamyl formyl imido cyano (—C≡N), thiocyano (—S—C≡) and sulfoxy groups, provided however that the cyano, thiocyano and sulfoxy groups require attachment (through their unsatisfied carbon and sulfur valences) to a carbon atom which is in turn attached to at least one hydrogen atom (alphahydrogen) in order to render them effective. The dimethyl carbamyl and the formyl imido groups are effective in the absence of the alphahydrogen atom. (It is possible that they contain the equivalent of an alpha-hydrogen atom within their own structures.) Thus, the groups dimethyl carbamyl formyl imido (HCON<), cyanomethylene (>CHCN), thiocyanomethylene (>CHSCN) and sulfoxymethylene (>CHSO—, >CHSO₂—, >CHSOO—, and >CHSO₂O—) shall hereinafter be referred to as solvogenic groups and compounds containing them are frequently capable of dissolving an acrylonitrile polymer containing at least 85% by weight of acrylonitrile.

In the event that two or more groups requiring the presence of an alpha-hydrogen atom in order to render them solvogenic are attached to the same carbon atom and compete with each other for an available alpha-hydrogen atom, the sulfoxy group, the cyano group and the thiocyano group take preference over each other in the order named, to form the solvogenic group, the lower ranking group or groups present assuming merely the nature of an inert substituent on the carbon atom.

It has furthermore been found that compounds containing the above-mentioned solvogenic groups will be solvents for the above-mentioned polymers only if the carbon content of the compound be within certain limits, the limits for the compounds of the present invention being given below. If the ratio of carbon to solvogenic groupings is maintained within the said limits, the compounds will retain solvent properties of the polymer even though the molecule be of considerable size and complexity. The solvent power of the compound for acrylonitrile polymers is generally increased if more than one of the solvogenic groups is present in the molecular structure of the compound, the effect of these groups being additive.

It has now been found that sulfoxy methylene compounds which are fusible without decomposition and particularly those sulfoxy methylene compounds embraced by the following empirical formula and preferably having a melting point below 250° C., will dissolve polyacrylonitrile and copolymers and interpolymers of acrylonitrile in which at least 85% by weight of the polymer is acrylonitrile:

wherein X represents the free valence of the sulfoxy group being also attached to carbon; $m$, $q$ and $u$ are integers equal to or greater than zero; $w$ is an integer equal to or greater than 1; $n$, $p$, $r$ and $v$ are integers of such value than $n/m$ is equal to or less than 1.5; $p/q$ is equal to or less than 1.5; $r/u$ is equal to or less than 0.5 and $v/w$ is equal to or less than 2.

The compounds are not salts but may be cyclic or acyclic in nature and may possess one or more ethylenic or acetylenic linkages. Valences other than those contained in carbon-to-carbon linkages and not shown to be satisfied in the above empirical formula must be satisfied by a substituent taken from the group consisting of hydrogen, halogen, oxygen, bivalent sulfur atoms or by hydroxyl, thiol, cyano, thiocyano, or sulfoxy radicals, the total number of said halogen, oxygen, bivalent sulfur, hydroxyl and thiol substituents not exceeding the sum $(m+q+u+w)$, i. e. the number of groups should equal at least the total number of any combination of said halogen, oxygen and bivalent sulfur atoms and the hydroxyl and thiol radicals, and the number of said non-solvogenic cyano, thiocyano and sulfoxy substituents not exceeding the value of $m+q+u+w$. The two respective tolerances for the two said groups of substituents are independent of each other and members of both groups may be present in the molecule up to their group tolerances. The said oxygen or sulfur substituents may be present as bivalent groups either as a side group (carbonyl or thiocarbonyl) or within the chain (ether or thioether), as the case may be. It is preferred that the carbon atoms in the $C_n$, $C_p$, $C_r$ and $C_v$ portions of the above formula be joined to each other, but this is not essential.

Representative compounds coming within the scope of the above formula and suitable for use as solvents for the above mentioned acrylonitrile polymers include:

$$CH_2(SO_2CH_3)_2$$

Methane disulfonic acid, dimethyl ester $$C_2H_5SO_2CH_2CH_2SO_2C_2H_5$$

Ethane-1,2-disulfonic acid, diethyl ester $$CH_3SO_2CH_2CH_2SO_2CH_3$$

Ethane-1,2-disulfonic acid, dimethyl ester 2-propanone-1,1,3-trisulfonic acid, trimethyl ester $$(CH_3SO_2CH_2)_2C=O$$

2-propanone-1,3-disulfonic acid, dimethyl ester $$CHCl(SO_2CH_3)_2$$

Chloromethane disulfonic acid, dimethyl ester $$(CH_3SO_2CH_2CH_2)_2O$$

Diethyl ether-2,2'-disulfonic acid, dimethyl ester $$(CH_3SO_2CH_2CH_2)_2$$

Butane-1,4-disulfonic acid, dimethyl ester $$(CH_3SO_2CH_2)_2S$$

Thio-bis(methane sulfonic acid), dimethyl ester $$(CH_3SO_2CH_2)_2CH_2$$

Propane-1,3-disulfonic acid, dimethyl ester $$(CH_3SO_2CH_2)_2CHOH$$

2-propanol-1,3-disulfonic acid, dimethyl ester $$CH_3SO_3CH_3$$

Methyl methane sulfonate

Methyl ethane sulfinate

Ethyl methane sulfinate

Methyl methane sulfinate $$CH_3SO_2CH_3$$

Dimethyl sulfone

CH₃SO₂CH₂CH₂OH
Beta-hydroxyethyl methyl sulfone
(CH₃SO₂CH₂CH₂)₂O
Bis(beta-methylsulfonylethyl) ether
(CH₃CH₂SO₂)₂CH₂
Bis(ethylsulfonyl) methane
CH₃CH(SO₂CH₃)₂
1,1-bis(methylsulfonyl) ethane
CH₃CH(SO₂C₂H₅)₂
1,1-bis(ethylsulfonyl) ethane
CH₃C(SO₂C₂H₅)₂CH₂SO₂C₂H₅
1,2,2-tris(ethylsulfonyl) propane
CH(SO₂C₂H₅)₃
Tris(ethylsulfonyl) methane
CHCl(SO₂C₂H₅)₂
Bis(ethylsulfonyl) chloromethane
(CH₃SO₂)₂CH₂
Bis(methylsulfonyl) methane

CH₃CH
  ⟨SO₂CH₃
   SO₂C₂H₅

1-methylsulfonyl-1-ethyl sulfonyl ethane
(CH₃SO₂CH₂SO₂CH₂)₂SO₂
Bis(methylsulfonylmethyl-sulfonylmethyl) sulfone CH₃
   |
CH₃CH₂C(SO₂CH₃)₂
2,2-bis(methylsulfonyl) butane
(CH₃)₂C(SO₂CH₃)₂
2,2-bis(methylsulfonyl) propane
CH₃CH₂CH(SO₂CH₃)₂
1,1-bis(methylsulfonyl) propane
(CH₃SO₂CH₂)₂SO₂
Bis(methylsulfonylmethyl) sulfone
(C₂H₅SO₂CH₂)₂SO₂
Bis(ethylsulfonylmethyl) sulfone
(C₂H₅SO₂CH₂)₂
1,2-bis(ethylsulfonyl) ethane
CH₂C(SO₂C₂H₅)₂C(SO₂C₂H₅)₂CH₃
2,2,3,3-tetrakis(ethylsulfonyl) butane
CH₃SO₂CH₂CH₃
Methyl ethyl sulfone
CH₂[CH(SO₂C₂H₅)₂]₂
1,1,3,3-tetrakis (ethylsulfonyl) propane
CH₃SO₂CH₂CH₂SO₂CH₃
1,2-bis(methylsulfonyl) ethane
(CH₃SO₂CH₂)₂C=O
1,3-bis(methylsulfonyl)-2-propanone
CH₃SOCH₂CH₂SOCH₃
1,2-bis(methylsulfinyl) ethane
C₂H₅SOCH₂CH₂SOC₂H₅
1,2-bis(ethylsulfinyl) ethane
C(CH₃SOCH₂)₄
Tetrakis(methylsulfinylmethyl) methane
CH₃CH₂SOCH₃
Methyl ethyl sulfoxide
(CH₃SO)₂CH₂
Bis(methylsulfinyl) methane
(CH₃SO)₂CHCl
Bis(methylsulfinyl) chloromethane
(CH₃)₂SO
Dimethyl sulfoxide CH₃CH(SOC₂H₅)₂
1,1-bis(ethylsulfinyl) ethane
CH₃CH(SOCH₃)₂
1,1-bis(methylsulfinyl) ethane CH₃
   |
CH₃CH₂C(SOCH₃)₂
2,2-bis(methylsulfinyl) butane
(CH₃)₂C(SOCH₃)₂
2,2-bis(methylsulfinyl) propane
CH₃CH₂CH(SOCH₃)₂
1,1-bis(methylsulfinyl) propane
CH₃SOCH₂CH₂SOCH₂CH₂Br
1-(beta-bromoethylsulfinyl)-2-(methylsulfinyl) ethane
NCS—CH₂CH₂SO₂CH₃
2-thiocyanoethanesulfonic acid, methyl ester
NCS—CH₂CHBrSO₂CH₃
1-bromo-2-thiocyanoethane-sulfonic acid, methyl ester
NC—CH₂CH₂SO₂CH₃
2-cyanoethanesulfonic acid, methyl ester
NC—CH₂CHBrSO₂CH₃
1-bromo-2-cyanoethanesulfonic acid, methyl ester
NC—CH₂CH₂SO₂C₂H₅
2-cyanoethanesulfonic acid, ethyl ester
NC—CHBrCH₂SO₂C₂H₅
2-bromo-2-cyanoethanesulfonic acid, ethyl ester
SO₂(CH₂SO₂CH₃)₂
Sulfonyl bis(methanesulfonic acid), dimethyl ester
CH₃CH₂SO₂CH₂CH₂SO₂C₂H₅
2-(ethylsulfonyl)ethanesulfonic acid, ethyl ester
CH₃SO₂CH₂CH₂SO₂C₂H₅
2-(methylsulfonyl)ethane-sulfonic acid, ethyl ester
SO(CH₂SO₂CH₃)₂
Sulfinyl bis(methanesulfonic acid), dimethyl ester
CH₃CH₂SOCH₂CH₂SO₂C₂H₅
2-(ethylsulfinyl)ethane-sulfonic acid, ethyl ester
CH₃SOCH₂CH₂SO₂C₂H₅
2-(methylsulfinyl)ethane-sulfonic acid, ethyl ester
CH₃SO₂CH₂CH₂CH₂CON(CH₃)₂
3-(N,N-dimethylcarbamyl)-1-propanesulfonic acid,
   methyl ester
CH₃SO₂CH₂CON(CH₃)₂
(N,N-dimethylcarbamyl) methane-sulfonic acid,
   methyl ester
C₂H₅SO₂CH₂CON(CH₃)₂
(N,N-dimethylcarbamyl) methane-sulfonic acid,
   ethyl ester
CH₃CH₂CH₂SO₂CH₂CON(CH₃)₂
(N,N-dimethylcarbamyl) methane-sulfonic acid,
   n-propyl ester
(CH₃)₂CHSO₂CH₂CON(CH₃)₂
(N,N-dimethylcarbamyl) methane-sulfonic acid,
   isopropyl ester CH₃
   |
(C₂H₅SO)CHSO₂C₂H₅
1-(ethylsulfinyl)-1-(ethyl-sulfonyl) ethane CH₃
   |
CH₃SOCHSO₂CH₃
1-(methylsulfinyl)-1-(methyl sulfonyl) ethane

CH₃   SOCH₃
      \ /
       C
      / \
   C₂H₅   SO₂CH₃

2-(methylsulfinyl)-2-(methyl-sulfonyl) butane

CH₃   SOCH₃
\\  /
 C
/  \\
CH₃   SO₂CH₃

2-(methylsulfinyl)-2-(methyl-sulfonyl) propane

SOCH₃
        |
CH₃CH₂CH
        |
        SO₂CH₃

1-(methylsulfinyl)-1-(methylsulfonyl) propane

CH₃CH₂SO₂CH₂CH₂SOCH₂CH₃
1-(ethylsulfinyl)-2-(ethyl-sulfonyl) ethane

CH₃SO₂CH₂CH₂SCN
1-thiocyano-3-(methylsulfonyl) propane

SO₂(CH₂CH₂CH₂SCN)₂
Bis (γ-thiocyanopropyl) sulfone (CH₃SO₂)₂CHCH₂CH₂SCN
1-thiocyano-3,3-bis (methyl-sulfonyl) propane (CH₃CH₂SO₂)₂CHCH₂CH₂SCN
1-thiocyano-3,3-bis (ethyl-sulfonyl) propane SO₂(CH₂SCN)₂
Bis (thiocyanomethyl) sulfone SCN
          |
SO₂(CHCH₃)₂
Bis (alpha-thiocyanoethyl) sulfone CH₃SO₂CH₂CH₂SCN
Methyl beta-thiocyanoethyl sulfone CH₃CH₂SO₂CH₂SCN
Thiocyanomethyl ethyl sulfone (NCS—CH₂CH₂SO₂CH₂CH₂)₂O
Bis [beta (beta'-thiocyanoethyl-sulfonyl) ethyl] ether CH₃CH₂SO₂CH₂CH₂SCN
Beta-thiocyanoethyl ethyl sulfone CH₃
         |
(CH₃CH₂SO₂)₂CCH₂SCN
1-thiocyano-2,2-bis(ethylsulfonyl) propane SO₂(CH₂CH₂CN)₂
Bis(beta-cyanoethyl) sulfone SO₂(CH₂CH₂CH₂CH₂CN)₂
Bis(δ-cyanobutyl) sulfone CH₃SO₂CH₂CHBrCN
Alpha-bromo-beta-(methylsulfonyl) propionitrile CH₃SO₂CH₂CN
(Methylsulfonyl) acetonitrile CH₃CH₂SO₂CH₂CN
(Ethylsulfonyl) acetonitrile CH₃SO₂CH₂CH₂CH₂CN
γ-(Methylsulfonyl) butyronitrile SO₂(CH₂CH₂CH₂CN)₂
Bis(γ-cyanopropyl) sulfone (CH₃SO₂)₂CHCH₂CH₂CN
γ,γ-Bis(methylsulfonyl) butyronitrile (CH₃CH₂SO₂)₂CHCH₂CH₂CN
γ,γ-Bis(ethylsulfonyl) butyronitrile CN
          |
(CH₃SO₂)₂CHCHCH₃
Beta,beta-bis(methylsulfonyl) isobutyronitrile CN
          |
(CH₃CH₂SO₂)₂CHCHCH₃
Beta,beta-bis(ethylsulfonyl) isobutyronitrile (CH₃CH₂SO₂)₂CHCH₂CN
Beta,beta-bis(ethylsulfonyl) propionitrile (CH₃SO₂)₂CHCH₂CN
Beta,beta-bis(methylsulfonyl) propionitrile CN
          |
(CH₃SO₂)₂CHCH—CH₂CH₂CN
Alpha-[bis(methylsulfonyl) methyl] glutaronitrile CN
          |
(CH₃CH₂SO₂)₂CHCH—CH₂CH₂CN
Alpha-[bis(ethylsulfonyl) methyl] glutaronitrile SO₂(CH₂CN)₂
Bis(cyanomethyl) sulfone CN
          |
SO₂(CHCH₃)₂
Bis(alpha-cyanoethyl) sulfone CH₃SO₂CH₂CH₂CN
Beta-(methylsulfonyl) propionitrile (NC—CH₂CH₂SO₂CH₂CH₂)₂O
Bis[beta(beta'-cyanoethylsulfonyl) ethyl] ether CH₃
         |
(CH₃CH₂SO₂)₂CCH₂CN
Beta,beta-bis(ethylsulfonyl) butyronitrile CH₃SO₂CH₂CON(CH₃)₂
N,N-dimethyl (methylsulfonyl) acetamide CH₃CH₂SO₂CH₂CON(CH₃)₂
N,N-dimethyl (ethylsulfonyl) acetamide CH₃
         |
CH₃CH₂SO₂C—CON(CH₃)₂
         |
         Br
N,N-dimethyl-alpha-bromo-alpha-(ethylsulfonyl) propionamide CH₃
         |
CH₃SO₂C—CON(CH₃)₂
         |
         Br
N,N-dimethyl-alpha-bromo-alpha-(methylsulfonyl) propionamide CH₃
         |
CH₃SO₂CHCON(CH₃)₂
N,N-dimethyl-alpha-(methyl-sulfonyl) propionamide CH₃
         |
CH₃CH₂SO₂CHCON(CH₃)₂
N,N-dimethyl-alpha-(ethyl-sulfonyl) propionamide SO₂[CH₂CON(CH₃)₂]₂
Bis(N,N-dimethylcarbamyl-methyl) sulfone SO₂[CH₂CH₂CON(CH₃)₂]₂
Bis[beta(N,N-dimethylcarbamyl) ethyl] sulfone CH₃CH₂SO₂CH₂CH₂CON(CH₃)₂
N,N-dimethyl-beta-(ethyl-sulfonyl) propionamide CH₃CH[SO₂CH₂CON(CH₃)₂]₂
1,1-bis(N,N-dimethylcarbamyl-methylsulfonyl) ethane

[(CH₃)₂NCOCH₂SO₂CH₂]₂
1,2-bis(N,N-dimethylcarbamyl-methylsulfonyl) ethane

CH₃
\\
 C[SO₂CH₂CON(CH₃)₂]₂
/
CH₃

2,2-bis(N,N-dimethylcarbamyl-methylsulfonyl) propane

CH₃COC(SO₂CH₂CH₃)₂CON(CH₃)₂
N,N-dimethyl-alpha, alpha bis(ethylsulfonyl)-alpha-aceto-acetamide CH₃SOCH₂CH₂CH₂SCN
1-thiocyano-3-(methylsulfinyl) propane SO(CH₂CH₂CH₂SCN)₂
Bis(γ-thiocyanopropyl) sulfoxide SO(CH₂SCN)₂
Bis(thiocyanomethyl) sulfoxide SO(CHCH₃)₂
   |
   SCN
Bis(alpha-thiocyanoethyl) sulfoxide CH₃SOCH₂SCN
Methyl beta-thiocyanoethyl sulfoxide CH₃CH₂SOCH₂SCN
Thiocyanomethyl ethyl sulfoxide (NCS—CH₂CH₂SOCH₂CH₂)₂O
Bis[beta-(beta'-thiocyanoethyl-sulfinyl) ethyl] ether CH₃CH₂SOCH₂CH₂SCN
Beta-thiocyanoethyl ethyl sulfoxide CH₃SOCH₂CN
(Methylsulfinyl) acetonitrile CH₃CH₂SOCH₂CN
(Ethylsulfinyl) acetonitrile CH₃SOCH₂CH₂CH₂CN
γ-(Methylsulfinyl) butyro-nitrile SO(CH₂CH₂CH₂CN)₂
Bis(γ-cyanopropyl) sulfoxide SO(CH₂CN)₂
Bis(cyanomethyl) sulfoxide SO(CHCH₃)₂
   |
   CN
Bis(alpha-cyanoethyl) sulfoxide CH₃SOCH₂CH₂CN
Beta-(methylsulfinyl) propionitrile (NC—CH₂CH₂SOCH₂CH₂)₂O
Bis[beta(beta'-cyanoethyl-sulfinyl) ethyl] ether CH₃SOCH₂CHBrCN
Alpha-bromo-beta-methyl-sulfinyl propionitrile O
     ‖
CH₃SCH₂CH₂SOCH₂CH₂CN
Beta[beta'(methylsulfinyl) ethylsulfinyl] propionitrile CH₃SOCH₂CON(CH₃)₂
N,N-dimethyl (methylsulfinyl) acetamide CH₃CH₂SOCH₂CON(CH₃)₂
N,N-dimethyl (ethylsulfinyl) acetamide CH₃
        |
CH₃SOCHCON(CH₃)₂
N,N-dimethyl-alpha-(methylsulfinyl) propionamide CH₃
        |
CH₃CH₂SOCHCON(CH₃)₂
N,N-dimethyl-alpha-(ethyl-sulfinyl) propionamide CH₃
        |
CH₃SOCBrCON(CH₃)₂
N,N-dimethyl-alpha-bromo-alpha-(methylsulfinyl) propionamide CH₃
        |
CH₃CH₂SOCBrCON(CH₃)₂
N,N-dimethyl-alpha-bromo-alpha-(ethylsulfinyl) propionamide SO[CH₂CON(CH₃)₂]₂
Bis(N,N-dimethylcarbamyl-methyl) sulfoxide SO[CH₂CH₂CON(CH₃)₂]₂
Bis[beta(N,N-dimethylcarbamyl-ethyl)] sulfoxide

[(CH₃)₂NCOCH₂SOCH₂]₂
1,2 bis(N,N-dimethylcarbamyl-methylsulfinyl) ethane

CH₃SOCH₂CH₂SOCH₂CON(CH₃)₂
N,N-dimethyl[beta-(methyl-sulfinyl) ethylsulfinyl] acetamide (CH₃)₂NCOCH₂SOCH₂CH₂SO₂C₂H₅
2-(N,N-dimethylcarbamylmethyl-sulfinyl) ethanesulfonic acid, ethyl ester (CH₃)₂NCOCH₂SOCH₂CH₂SO₂CH₃
2-(N,N-dimethylcarbamylmethyl-sulfinyl) ethanesulfonic acid, methyl ester NCS—CH₂CH₂SOCH₂CH₂SO₂C₂H₅
2-(beta-thiocyanoethylsulfinyl) ethanesulfonic acid, ethyl ester NCS—CH₂CH₂SOCH₂CH₂SO₂CH₃
2-(beta-thiocyanoethylsulfinyl) ethanesulfonic acid, methyl ester NC—CH₂CH₂SOCH₂CH₂SO₂C₂H₅
2-(beta-cyanoethylsulfinyl) ethanesulfonic acid, ethyl ester NC—CH₂CH₂SOCH₂CH₂SO₂CH₃
2-(beta-cyanoethylsulfinyl) ethanesulfonic acid, methyl ester (CH₃)₂NCOCH₂SO₂CH₂CH₂SO₂C₂H₅
2-(N,N-dimethylcarbamylmethyl-sulfonyl) ethanesulfonic acid, ethyl ester (CH₃)₂NCOCH₂SO₂CH₂CH₂SO₂CH₃
2-(N,N-dimethylcarbamylmethyl-sulfonyl) ethanesulfonic acid, methyl ester NCS—CH₂CH₂CH₂SO₂CH₂CH₂SO₂C₂H₅
2-(γ-thiocyanopropylsulfonyl) ethanesulfonic acid, ethyl ester NC—CH₂CH₂SO₂CH₂CH₂SO₂C₂H₅
2-(beta-cyanoethylsulfonyl) ethanesulfonic acid, ethyl ester NC—CH₂CH₂SO₂CH₂CH₂SO₂CH₃
2-(beta-cyanoethylsulfonyl) ethanesulfonic acid, methyl ester (CH₃)₂NCOCHS—CH₂CH₂SO₂CH₃
         |
         CH₂CH₂SCN
2-[γ-thiocyano-alpha-(N,N-dimethylcarbamyl) propylthio] ethanesulfonic acid, methyl ester SCN
        |
NC—CHCH₂SO₂C₂H₅
2-cyano-2-thiocyanoethanesulfonic acid, ethyl ester CN
              |
(CH₃)₂NCOCH₂S—CHCH₂SO₂C₂H₅
2-cyano-2-(N,N-dimethylcarbamylmethylthio) ethanesulfonic acid, ethyl ester CN
             |
(CH₃)₂NCOCH₂CH—S—CH₂CH₂SO₂C₂H₅
2-[alpha-cyano-beta-(N,N-dimethylcarbamyl) ethylthio] ethanesulfonic acid, ethyl ester

CN
           |
(CH₃)₂NCOCHCH₂CH₂SO₂C₂H₅
3-cyano-3-(N,N-dimethylcarbamyl)-1-propanesulfonic acid, ethyl ester

CH₂CH₂CN
           |
(CH₃)₂NCOCH—S—CH₂CH₂SO₂C₂H₅
2-[γ-cyano-alpha-(N,N-dimethylcarbamyl) propylthio] ethanesulfonic acid, ethyl ester SCN
        |
CH₃CH₂SOCH₂CHCON(CH₃)₂
N,N-dimethyl-alpha-thiocyano-beta-ethylsulfinyl-propionamide (CH₃)₂NCOCH₂SOCH₂CH₂CN
γ-(N,N-dimethylcarbamylmethylsulfinyl)-butyronitrile CN
           |
CH₃CH₂SOCH₂CHCON(CH₃)₂
N,N-dimethyl-alpha-cyano-beta-ethylsulfinyl propionamide Alpha cyanomethyl trimethylene sulfone In lieu of the sterile groups, such as CN for example, in certain of the above typical compounds, other groups in the sterile state may be included in the molecule, e. g. SCN, sulfoxy, etc., provided that the tolerance limits are observed as explained above.

All of these compounds are miscible in a wide range of proportions with polyacrylonitrile, and copolymers and interpolymers of acrylonitrile and they do not appear to react with or decompose them. Many of the compounds are also miscible with (soluble in) such non-solvent liquids for the polymeric materials as water, aqueous salt solutions, alcohol, glycerol, etc. Solutions of an acrylonitrile polymer in many of the compounds of this invention can therefore be extruded into such liquids to form shaped articles such as yarns, films, etc. of the polymer with the solvent being removed by selective solution in the liquid coagulant. Moreover, because many of the compounds of the invention are volatile (vaporizable without decomposition at atmospheric pressure and at temperatures not exceeding 250° C.), solutions of the polymer in such compounds are eminently suited for use in a dry spinning or casting process for the preparation of a yarn or film of the polymer.

For the purpose of definition, a solvent is a material which, when in the liquid state, is capable of forming solutions in which the polymer is present in a concentration of 5% or more. In most instances, the solvent and polymer are miscible in almost all proportions although the miscibility may take place at elevated temperatures in the case of certain compounds.

The solutions of the invention are prepared by dissolving the polyacrylonitrile, or copolymer or interpolymer of acrylonitrile with one or more of the compounds of this invention. Some of these compounds exist in the solid state at ordinary temperatures and dissolve or retain the polymer in clear solution only at elevated temperatures, for example at temperatures of 100° C. or higher, below which temperature the composition takes on the appearance of a gel. Even in such a case however, there is usually no substantial evidence of immediate separation of the gel into two phases although after standing (i. e. sometimes after a period of several weeks), the gels may undergo syneresis. This phenomenon of gel formation or syneresis is reversible however and subsequent heating of the gelled or syneresed mass causes it to revert to solution form.

In view of the relatively high melting points of some of the solvents of this invention, they would have comparatively little use in the production of an acrylonitrile polymer spinning or casting solution. Such solvents are, however, excellent solvent plasticizers for acrylonitrile polymers since they are soluble in a wide range of proportions with the said polymers. The present invention, therefore, contemplates solid solutions of acrylonitrile polymers containing at least 85% by weight of acrylonitrile as well as liquid solutions thereof.

Shaped articles obtained from solvent solutions of acrylonitrile polymer prepared in accordance with the invention and from which the solvent is subsequently removed are substantially free of foreign matter and voids after removal of the solvents and the acrylonitrile polymer remains substantially undecomposed and chemically unchanged from the original acrylonitrile polymer prior to its solution.

The above described organic solvent solutions of acrylonitrile polymer may be shaped in the form of filaments, yarns, films, tubes and like structures by apparatus and processes generally known in the art, the detailed operating conditions being suitably modified.

Suitable methods and apparatus for the production of shaped articles of the polymers of this invention will be readily apparent by reference to the following detailed description when taken in connection with the accompanying illustrations in which.

Figures 1, 2, 3, 4:
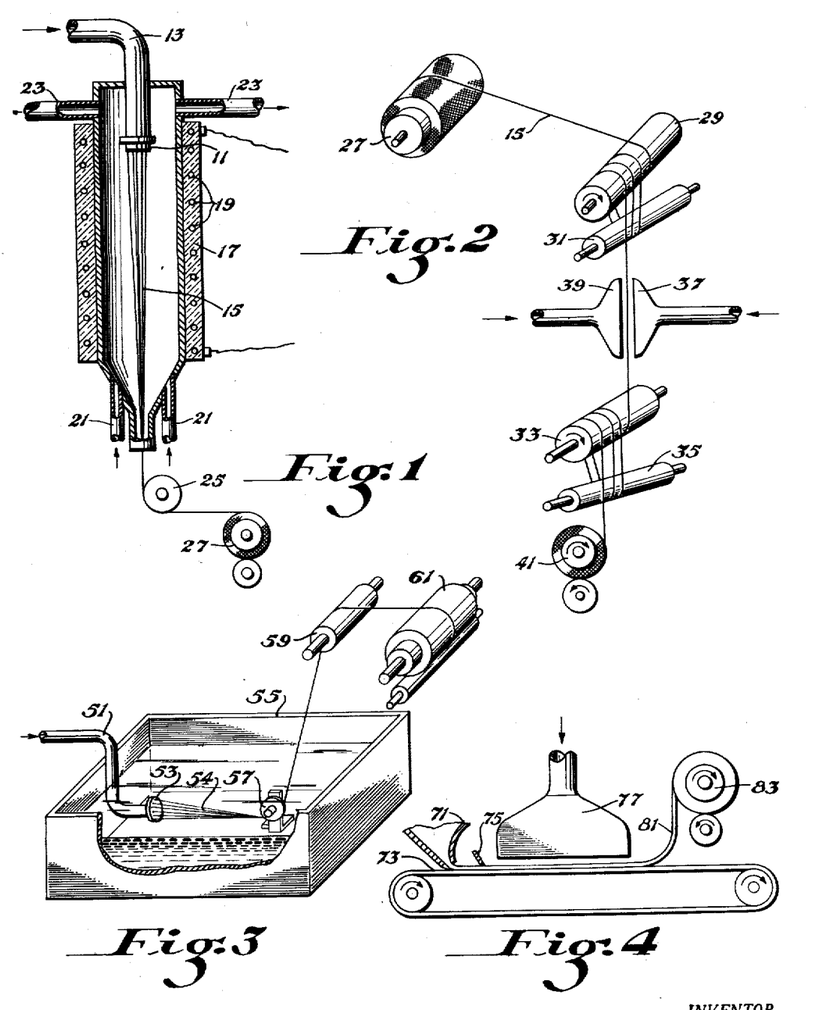
Figure 1 is a diagrammatic vertical sectional view showing a dry spinning cell suitable for use in accordance with the invention.
Figure 2 is a diagrammatic perspective view showing a yarn drawing device for use in connection with the invention.
Figure 3 is a diagrammatic perspective view showing a wet spinning apparatus for use in the invention.
Figure 4 is a diagrammatic side elevational view showing a suitable film casting apparatus for use in accordance with the invention.

Referring to Figure 1 of the drawing, reference numeral 11 designates a spinneret through which a plurality of filaments 15 are formed by extruding a filament-forming solution supplied to the spinneret by means of conduit 13. The spinning cell is jacketed with a material 17 such as a refractory in which is embedded an electrical heating coil 19. The spinning cell can thus be operated at any desired temperature. A plurality of conduits 21 are provided adjacent the bottom of the device for passing evaporative medium through the cell so as to evaporate the solvent from the extruded filaments 15. The evaporative medium is removed from the cell through outlet openings 23. The yarn comprising the plurality of filaments 15 is passed from the bottom of the spinning cell around guide roller 25 and is wound on a bobbin 27.

Referring to Figure 2 of the drawing, the yarn 15 is removed from the bobbin package 27 and passed about draw roller 29, and separating roller 31. From draw roller 29, the yarn is passed to a second draw roller 33 and separating roller 35. The yarn is passed around the two sets of draw rollers including their separating rollers a sufficient number of turns to prevent slippage of the yarn. Draw roller 33 is rotated at a greater speed, for example three to ten times the speed of draw roller 29. In this manner, the yarn 15 is stretched between the two draw rollers. As the yarn passes between the two draw rollers, a heating medium is brought into contact with the yarn through blower nozzles 37 and 39. The yarn passing from the draw roller 33 is wound on bobbin 41. The drawing or stretching of the spun yarn as described is not claimed as part of the present invention, but is claimed in the copending application of Daniel T. Meloon, Serial No. 496,397, filed July 28, 1943.

Figure 3 of the drawing illustrates a wet spinning apparatus for the production of yarn. The acrylonitrile polymer solution is passed through conduit 51 and is extruded through spinneret 53 to form a multifilament yarn 54. The yarn 54 is passed about guide roller 57 which is positioned within the coagulating liquid in tank 55. The yarn is then passed about guide roller 59 and is wound on bobbin 61.

The organic solvent solution of the acrylonitrile polymer may be cast in the form of a film as illustrated in Figure 4. In accordance with this apparatus, the polymer solution is passed from hopper 71 on to the endless steel band 73 where it is smoothed by means of a doctor knife 75. The band, together with the film, is passed under a means 77 for bringing a heated drying medium into contact with the film. The film 81 is pulled from the band 73 and collected on a mill roll 83.

The polyacrylonitrile for use with the invention is preferably prepared by the ammonium persulfate catalyzed polymerization of monomeric acrylonitrile dissolved or emulsified in water. It can, however, be prepared by any other suitable type of polymerization reaction, such as, for example, the emulsion type reaction disclosed by U. S. Patent No. 2,160,054 to Bauer et al. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \dfrac{\text{viscosity of solution}}{\text{viscosity of solvent}} - 1$ and $C = $ concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. For example, polyacrylonitrile having a molecular weight of approximately 60,000 can be prepared as follows: To 94 pounds of distilled water heated to 40° C. add 40 grams of ammonium persulfate catalyst and 80 grams of sodium bisulfite activator. Then add 16 pounds of acrylonitrile slowly with stirring over a period of two hours. The polyacrylonitrile having the above said molecular weight will precipitate from the solution. Increasing or decreasing the amount of the catalyst, while maintaining the other conditions constant, decreases or increases the molecular weight of the polymer. Acrylonitrile copolymers containing at least 85% by weight of acrylonitrile and likewise preferably possessing a molecular weight of 15,000 to 250,000 or higher can be prepared in a similar manner.

The following examples in which parts, proportions and percentages are by weight unless otherwise specified illustrate preferred methods of preparing solutions in accordance with the principles of this invention and of employing these solutions in the manufacture of commercially satisfactory shaped articles of the polymer. The invention is not to be limited by the details set forth in the examples.

Example I

Fifteen (15) parts of a polyacrylonitrile prepared by the polymerization of monomeric acrylonitrile in accordance with the teachings of U. S. Patent No. 2,160,054 to Bauer et al. and possessing an average molecular weight of 120,000 as determined by the Staudinger equation from viscosity data are ground to an average particle size of 200 mesh and mixed with 85 parts of dimethyl sulfoxide, the resulting mixture being heated within a period of fifteen minutes to a temperature of 90° C. to form a clear solution possessing a viscosity of 100 poises at this temperature. If subsequently cooled, the solution becomes more viscous.

The solution was heated to a temperature of 90° C., cast on to a surface heated to 90° C. and dried to form a thin, transparent film of acrylonitrile polymer, the film being tough, flexible and tear resistant. The film of acrylonitrile polymer remaining on the plate is then removed from the plate to yield a strong, transparent sheet of approximately 0.001 inch in thickness. The sheet, in addition to being flexible and resistant to tearing, is insensitive to the common volatile organic solvents. It is substantially impervious to oils, hydrocarbons and common organic substances. It is approximately sixteen times as impervious to the transmission therethrough of moisture vapor as a sheet of regenerated cellulose of the same thickness. In addition, the sheet possesses a brilliant clearness that makes it especially desirable for commercial use. The film can, if desired, be stretched longitudinally and transversely to improve its strength in these directions. It is characteristic of this stretched film that it does not shrink greatly when subjected to elevated temperatures. For example, such a film, when subjected to a temperature of 175° C., will shrink approximately 10%.

Example II

Twenty (20) parts of a copolymer consisting of 90% acrylonitrile and 10% vinyl thiolacetate prepared by the aqueous emulsion polymerization of acrylonitrile and vinyl thiolacetate were dissolved in 80 parts of dimethyl sulfone by warming. The resulting clear solution was extruded at a temperature of 115° C. into a bath comprising glycerol heated to 115° C. to form a 15-filament yarn having a total denier of 150. A bath travel of 24 inches was employed, the yarn being subjected to a tension of 0.7 gram per denier (based on the final yarn denier) during its travel through the bath. The dimethyl sulfone was removed from the yarn by the glycerol, thereby coagulating the copolymer. The yarn, which possessed a tenacity of 4.0 grams per denier and an elongation of 12%, was colorless and lustrous in appearance. It accepted acid and basic dyes readily.

Example III

Seventy-five (75) parts of the powdered polyacrylonitrile of Example I were intimately mixed with 25 parts of solid bis(beta methylsulfonylethyl) ether and heated to a temperature of 170° C. to form a viscous, homogeneous mass or solution. Subsequent cooling of this solution to room temperature resulted in the formation of a gel-like mass of high viscosity which could be molded to a strong, tough, rod-like structure.

The solution of acrylonitrile polymer dissolved in an organic solvent in accordance with this invention must be of such a concentration that its viscosity at the operating temperature is within a workable range. When it is to be employed in the spinning of yarn or the casting of film, the solution should preferably have a viscosity within the range of 25 to 750 poises. When the polymer has a molecular weight of 250,000 or more, this requires that the maximum concentration of polymer in the spinning solution be of the order of 10%. Generally, it is preferred that the spinning solution contain at least 10% of the polymer because of the difficulty of rapidly removing large amounts of solvent from the solution in the spinning operation. Moreover, it is economically undesirable to use such large amounts of solvent for the spinning of a given amount of polymer although it is true that the solvent can be completely recovered from the spinning operation and reused. For these reasons, it is preferred to employ a polymer having an average molecular weight of between 40,000 and 150,000 since such a polymer forms a solution of the desired viscosity in concentrations of the order of 15% to 25%, and at a desirable spinning temperature of the order of 100° to 150° C. Of course, it is within the scope of the invention to heat the solution to a higher temperature, even to above the normal boiling point of the solvent, for the actual spinning operation. Here again, the controlling factor with regard to the temperature of the spinning solution is the viscosity of the solution.

The evaporative medium employed in the dry spinning of filaments and yarns or the dry casting of films in accordance with this invention may be any vapor inert to the film- or filament-forming solution such as air, nitrogen, steam, etc., or any suitable mixture thereof. The temperature of the evaporative medium is dependent on such factors as the dimensions of the spinning cell, the composition and rate of extrusion of the spinning solution and the rate of flow of the evaporative medium. It is only necessary that these several factors be so correlated that the yarn or other shaped article leaving the spinning cell be sufficiently freed of the solvent so that it is solidified and capable of being wound into package form or otherwise collected.

As indicated in Example II above, shaped articles of acrylonitrile polymer can also be formed by extruding the spinning solution into a suitable precipitating bath comprising a liquid that is miscible with the solvent but is a chemically inert non-solvent for the acrylonitrile polymer.

As examples of such a liquid may be mentioned water, glycerin, organic solvents, such as alcohol, ether, etc., or aqueous solutions of salts, alkalies or acids. The co-pending application of William W. Watkins, Serial No. 496,376, filed July 28, 1943, covers the use of glycerol and aqueous solutions of salts as baths, preferably at elevated temperatures, for the wet spinning of acrylonitrile polymer yarn, from solutions of the polymer, preferably with substantial tension and stretch being applied during spinning.

The length of travel of the shaped article through the precipitating or coagulating liquid is not critical to the invention, provided only that it be sufficiently long to solidify the acrylonitrile polymer. When the precipitating bath is water, the bath travel may be as short as ½ inch, or it may be 18 or more inches in length. When the precipitating liquid is an aqueous salt solution such as a 20% solution of calcium chloride, the solidification of the acrylonitrile polymer structure is generally more gradual than in the case of water so that it is necessary to use a somewhat longer bath travel than with water. If desired, suitable means such as guide rods or rollers may be placed in the bath to tension the yarn or other shaped article during its formation.

The article of acrylonitrile polymer thus obtained can advantageously be subjected to a stretching operation of the type employed in the above examples. This stretching is preferably performed by passing the yarn between two positively driven rollers, the peripheral speeds of which are so adjusted that the article is stretched to from two to ten times its original length, preferably approximately six times its original length. This stretching of the formed article may be performed at any suitable time. However, in the case of articles formed by the wet spinning or casting technique, it is preferably performed before the article has been completely dried. The orientation of the structure thus obtained greatly improved the physical properties of the structure including its tenacity, its resilience, etc.

This stretching of the shaped article can also be accomplished by causing the article, while passing between stretching rollers, to contact a heated stationary pin, or to pass through an inert medium such as air, water, glycerin, etc., heated to a high temperature. Obviously, the article must not be exposed to this high temperature for a period sufficiently long to decompose the polymer. In general however, the time of contact of the article with the heated medium is so short that temperatures up to 250° C. can be employed. Although it is generally preferred to heat the article to a temperature of at least 100° C. during the stretching operation, this is not essential. Desirable results can be obtained by stretching the article without the application of heat, for example by stretching at room temperature.

In addition to acting as solvents for polyacrylonitrile, or copolymers or interpolymers of acrylonitrile, the sulfur-containing compounds of this invention, when present in small amounts, can also be used as plasticizing agents for the polymer and the higher boiling compounds of the invention are especially suited for such use. At the same time, it is, of course, to be understood that non-solvent softeners such as glycerol, etc., can also be incorporated in the solutions of this invention, these materials remaining in the subsequently formed articles to impart a softening effect. If it is desired to use such plasticizing or softening agents with polyacrylonitrile, they are preferably added in the desired amount to an already formed solution of the polymer in a lower boiling solvent, for example to a solution of the polymer in dimethyl sulfoxide.

Although the discussion thus far has been directed mainly toward the manufacture of yarns and films of acrylonitrile polymer, the solutions provided by the invention and the evaporative and wet spinning processes described above are equally well adapted for use in the manufacture of other shaped articles of acrylonitrile polymer such as artificial horsehair, straws, bristles, tubes, bands and ribbons. For example, the solutions may be extruded through a suitable die and into a heated atmosphere or precipitating bath to form a tubular structure, or they may be extruded in any other desired manner. Moreover, because the solvents of the invention are miscible in a wide range of proportions with acrylonitrile polymer, the powdered polymers may be treated with small amounts of the solvent to yield a substance suitable for use in the formation of molded articles. This is a particularly important result inasmuch as it has heretofore been difficult to use this material in molding operations. In this same manner, a plurality of sheets of acrylonitrile polymer may be treated with small amounts of solvents and pressed together to form laminated articles. When present in the shaped article, the solvents of this invention (particularly those of high boiling point) are excellent plasticizers. Of course, the shaped articles may also be treated with non-solvent softening agents, for example glycerol. These plasticizing and softening agents may be incorporated in the solution of this invention or they may be applied to the shaped article as an after-treatment; or they may be added to the acrylonitrile polymer by a milling operation wherein the agents and polymers are worked between rotating rollers until a mass of the desired consistency is obtained.

This invention is primarily concerned with the steps of dissolving acrylonitrile polymers in a suitable solvent to form a stable solution adapted for use in the manufacture of shaped articles. It is characteristic of the invention that the solutions provided by it are stable; the solvents do not cause a decomposition or chemical alteration of the dissolved acrylonitrile polymer. At the same time, it is also characteristic that the solvents provided by the invention are also useful in the dissolving of mixtures of acrylonitrile polymer and adjuvants such as dye modifiers, linear polyamides such as nylon, derivatives of cellulose including cellulose ethers and esters, polymers of vinyl compounds such as vinyl chloride, vinyl acetate, acrylic acid, etc., which adjuvants may be incorporated in the acrylonitrile polymer solution to modify the properties, both chemical and physical, of the resulting shaped articles.

Although this invention has been described with particular regard to polyacrylonitrile, i. e. polymerized vinyl cyanide, the solvents and processes of this invention are equally useful in forming clear, stable solutions of such acrylonitrile copolymers and interpolymers as were considered heretofore to be insoluble in volatile organic solvents, i. e. acrylonitrile copolymers and interpolymers containing at least 85% by weight of acrylonitrile; such solutions can be used in the same way and for the same purposes as described herein with respect to polyacrlyonitrile. It is therefore considered to be within the scope of this invention to dissolve in the above mentioned solvents copolymers and interpolymers in which acrylonitrile is copolymerized or interpolymerized with polymerizable substances such as, for example, compounds containing one or more ethylenic linkages, e. g. vinyl acetate, vinyl chloride, acrylic acid and its esters and homologues, styrene, isobutylene and butadiene, as well as other vinyl and acrylic compounds, other olefinic or diolefinic hydrocarbons, etc. and polymers of such substances. The solvents of the present invention will also be useful as new solvents for acrylonitrile polymers which have less than 85% by weight of acrylonitrile and especially those having an average molecular weight of 15,000 to 250,000 as determined by viscosity data using the Staudinger equation and intended particularly for use in the manufacture of yarns and films.

The invention also provides a class of materials that is eminently suited for use in plasticizing structures comprising the acrylonitrile polymers. The materials provided by this invention are apparently true solvents for the above mentioned acrylonitrile polymers. They do not tend to react with or decompose the polymer, the polymeric material obtained from the solution of this invention apparently being of the same identical chemical composition as the initial polymer. Thus, the solvents and solutions of acrylonitrile polymer provided by this invention when used in relatively small amounts are capable of softening and moistening solid particles of polymers of acrylonitrile having at least 85% by weight of acrylonitrile, whereby it is possible to form molded articles of acrylonitrile polymer. Such a process is especially adapted to the formation of laminated structures from films of polyacrylonitrile, or even from films of other substances.

The invention provides practical methods for preparing shaped articles of polymers of acrylonitrile having at least 85% by weight of acrylonitrile, which articles are characterized by desirable physical and chemical properties. For example, the articles are resistant to the action of water and the common organic solvents. They are not affected by prolonged contact with relatively concentrated solutions of sulfuric acid, or other mineral acid, nor are they affected by dry cleaning solvents, etc. They differ from articles of other polymerized vinyl compounds, such as polymerized vinyl chloride, in that they do not shrink greatly when heated to high temperatures. They possess a desirable high dielectric strength and are not harmed by prolonged exposure to ultraviolet light. They are also very resistant to the action of mold and bacteria growth.

Yarns, films and similar articles of polyacrylonitrile prepared from the solutions of this invention can be stretched to yield oriented structures that possess a high tenacity, a desirable elongation, and a high elastic recovery that compares favorably with that of silk. The articles are not contaminated with undesirable salts and they are substantially free of void spaces. The films, tubings and similarly shaped articles are approximately sixteen times as impervious to the transmission of moisture vapor as are films, tubings, etc. of regenerated cellulose of the same thickness. They are substantially impervious to oils and hydrocarbons including aviation gasolines.

Because of these several unique properties which may be combined here in a single substance, acrylonitrile polymer articles produced in accordance with the principles of this invention find many important uses. While yarns made from these polymers are capable of use wherever yarns have previously been used with more or less advantage, there are certain fields where the properties of the polymer especially commend them. For example, the high tenacity, flexibility and resilience of the yarns of the invention make them suitable for use in the manufacture of hosiery and other articles of clothing while the resistance to soiling and ease of cleaning (common cleaning agents may be used on them without danger) make them desirable for use in flat fabrics and either as multifilament or monofilament yarns in the manufacture of pile fabrics including velvets, plushes, upholstery or carpeting. The yarns can be advantageously used as either the pile and/or backing of such fabrics. At the same time, their low water absorption, high resistance to mold and bacteria growth and pronounced resistance to ultraviolet light make the yarns highly suited for use in outdoor fabrics such as tents, awnings, tarpaulins, flags, sails and the like. These same factors, taken together with the low density of the yarn (specific gravity of 1.16 as compared with 1.52 for cellulose), also permit the yarns to be manufactured into clothing and other articles for use in tropical climates where light weight, flexible fabrics that resist the action of weather, direct sunlight and mold growth are required. Other uses based on these same and related properties include the manufacture of the yarns into fishing lines, fish nets, cordage especially for marine purposes, bathing suits, umbrellas and the like. It is, of course, to be understood that the yarns of the invention can be employed in these uses in the form of either continuous filaments or as staple fibers of any given length. They can be formed into novelty yarns with other fibers, both natural and synthetic in character, and because of their high resilience, the staple fibers of the invention, particularly when crimped, are highly suited for admixture with wool.

Still other uses, particularly for monofilamentary structures of the polymer, include the manufacture of rattan-like fabric for furniture, bristles and window screening wherein the light weight, low water absorption and high resistance of the polymer to ultra-violet light, sulfur fumes and salt air are important attributes. Moreover, the high flexibility and durability of such structures enable screens made of them to be rolled up when not in use, thus permitting their incorporation as an integral part of the window structure.

As previously mentioned, the acrylonitrile polymers with which this invention is concerned are highly resistant to the action of acids and most other chemical reagents including oils, greases and the like and this fact, taken together with their high softening point and controlled shrinkage, makes yarns of the polymer highly useful in industrial applications including such uses as filter cloths, covers for rayon spinning bobbins and cakes, clothing for workers in areas where acids and other corrosive fumes are present and the like. Still another important use, dependent mainly on its resistance to acids, comprises the manufacture of the yarn or other shaped articles of the polymer including films and tubings into liners, separators or other protective parts for storage batteries, particularly of the heavy duty type.

The above uses are primarily concerned with yarns (either multifilamentary or monofilamentary in character) of the polymer. However, it will be understood that the same desirable properties (also present in other shaped articles of the polymer such as film, tubing and the like) make these other articles useful in similar applications such as the protection of objects from the effects of moisture, common organic solvents and chemical reagents and as containers or tubing for the packaging or transport of liquids including corrosive liquids, oils, greases and the like. Moreover, because of their clarity and brilliance, films of an acrylonitrile polymer prepared in accordance with this invention also find an important use in the decorative art.

The solutions prepared in accordance with the present invention are also suited for use as lacquers or coating compositions and are especially suitable for use in the coating of wire and electrical parts where the high chemical and electrical resistance of the polymer is important.

Reference, throughout the specification and claims, to acrylonitrile polymers, polymers of acrylonitrile, and copolymers and interpolymers of acrylonitrile "containing at least 85% by weight of acrylonitrile" signifies polymers containing in their molecules at least 85% by weight of the acrylonitrile unit which is considered to be present in the polymer molecule as the group that is, at least 85% by weight of the reactant material converted into and forming the polymer is acrylonitrile.

Since it is obvious that many changes and modifications can be made in the above described details without departing from the nature and spirit of the invention, it is to be understood that the invention is not to be limited to the details described herein except as set forth in the appended claims.

I claim:

1. As a new composition of matter, a polymer of acrylonitrile containing in the polymer molecule at least 85% by weight of acrylonitrile and a compound embraced by the formula:

wherein X represents a member of the class consisting of the free valence of the sulfoxy group being also attached to carbon; $m$, $q$ and $u$ are integers at least equal to zero; $w$ is an integer at least equal to 1; $n$, $p$, $r$ and $v$ are integers of such value that $n/m$ does not exceed 1.5; $p/q$ does not exceed 1.5; $r/u$ does not exceed 0.5 and $v/w$ does not exceed 2; all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano and sulfoxy; the total number of said halogen, oxygen, sulfur, hydroxyl and thiol substituents not exceeding the sum $(m+q+u+w)$ and the number of cyano, thiocyano and sulfoxy groups not exceeding the sum $(m+q+u+w)$.

2. As a new composition of matter, a polymer of acrylonitrile containing in the polymer molecule at least 85% by weight of acrylonitrile dissolved in a solvent comprising an organic sulfoxy compound, said compound embraced by the formula:

wherein X represents a member of the class consisting of the free valence of the sulfoxy group being also attached to carbon; $m$, $q$ and $u$ are integers at least equal to zero; $w$ is an integer at least equal to 1; $n$, $p$, $r$ and $v$ are integers of such value that $n/m$ does not exceed 1.5; $p/q$ does not exceed 1.5; $r/u$ does not exceed 0.5 and $v/w$ does not exceed 2; all valences of said compound other than those contained in carbon-to-carbon linkages and not shown as satisfied in the formula being satisfied by a substituent taken from the group consisting of hydrogen, halogen, oxygen, bivalent sulfur, hydroxyl, thiol, cyano, thiocyano and sulfoxy; the total number of said halogen, oxygen, sulfur, hydroxyl and thiol substituents not exceeding the sum $(m+q+u+w)$ and the number of cyano, thiocyano and sulfoxy groups not exceeding the sum $(m+q+u+w)$.

3. A new composition of matter as defined in claim 2 in which the polymer is polyacrylonitrile.

4. A new composition of matter as defined in claim 2 in which the polymer has a molecular weight of between 15,000 and 250,000.

5. A new composition of matter as defined in claim 2 in which the polymer has a molecular weight of between 40,000 and 150,000.

6. A new composition of matter as defined in claim 2 in which the polymer solution has a viscosity within the range 25 to 750 poises.

7. As a new composition of matter, a polymer of acrylonitrile containing in the polymer molecule at least 85% by weight of acrylonitrile dissolved in dimethyl sulfoxide.

8. As a new composition of matter, a polymer of acrylonitrile containing in the polymer molecule at least 85% by weight of acrylonitrile dissolved in beta hydroxyethylmethyl sulfone.

9. As a new composition of matter, a polymer of acrylonitrile containing in the polymer molecule at least 85% by weight of acrylonitrile dissolved in dimethyl sulfone.

10. The composition of claim 2 in which the solution contains at least 10% of said polymer of acrylonitrile.

11. The composition of claim 2 in which the polymer is polyacrylonitrile having a molecular weight of between 15,000 and 250,000.

12. The composition of claim 2 in which the polymer is polyacrylonitrile having a molecular weight of between 40,000 and 150,000.

13. The composition of claim 7 in which the polymer is polyacrylonitrile.

14. The composition of claim 8 in which the polymer is polyacrylonitrile.

15. The composition of claim 9 in which the polymer is polyacrylonitrile.

RAY CLYDE HOUTZ.

Certificate of Correction

Patent No. 2,404,717.  RAY CLYDE HOUTZ  July 23, 1946.

It is hereby certified that errors appear in the printed specification of the above numbered patent requiring correction as follows: Column 4, line 46, for "(—S—C≡)" read (—S—C≡N); column 11, lines 4 and 5, strike out the formula and insert instead the following—

$$\underset{SO(CHCH_1)_1}{\overset{SCN}{|}}$$

column 20, line 73, for "polyacrlyonitrile" read *polyacrylonitrile*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.* polymer is polyacrylonitrile having a molecular weight of between 15,000 and 250,000.

12. The composition of claim 2 in which the polymer is polyacrylonitrile having a molecular weight of between 40,000 and 150,000.

13. The composition of claim 7 in which the polymer is polyacrylonitrile.

14. The composition of claim 8 in which the polymer is polyacrylonitrile.

15. The composition of claim 9 in which the polymer is polyacrylonitrile.

RAY CLYDE HOUTZ.

Certificate of Correction

Patent No. 2,404,717.　　　　　　　　　　　　　　　　　　　　July 23, 1946.

RAY CLYDE HOUTZ

It is hereby certified that errors appear in the printed specification of the above numbered patent requiring correction as follows: Column 4, line 46, for "(—S—C≡)" read (—S—C≡N); column 11, lines 4 and 5, strike out the formula and insert instead the following—

$$\begin{array}{c} \text{SCN} \\ | \\ \text{SO(CHCH}_3)_3 \end{array}$$

column 20, line 73, for "polyacrlyonitrile" read *polyacrylonitrile*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*